Patented Apr. 13, 1926.

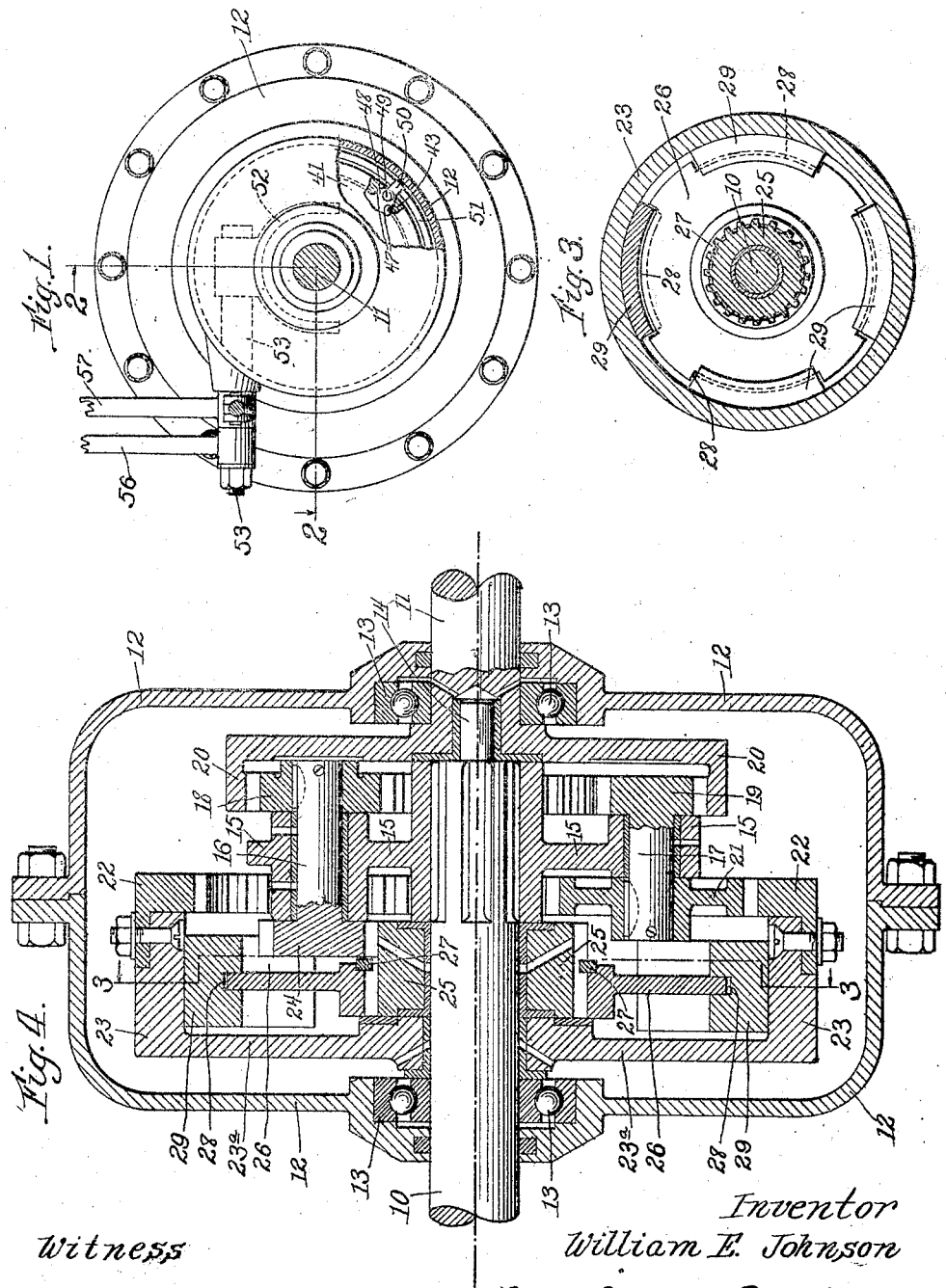

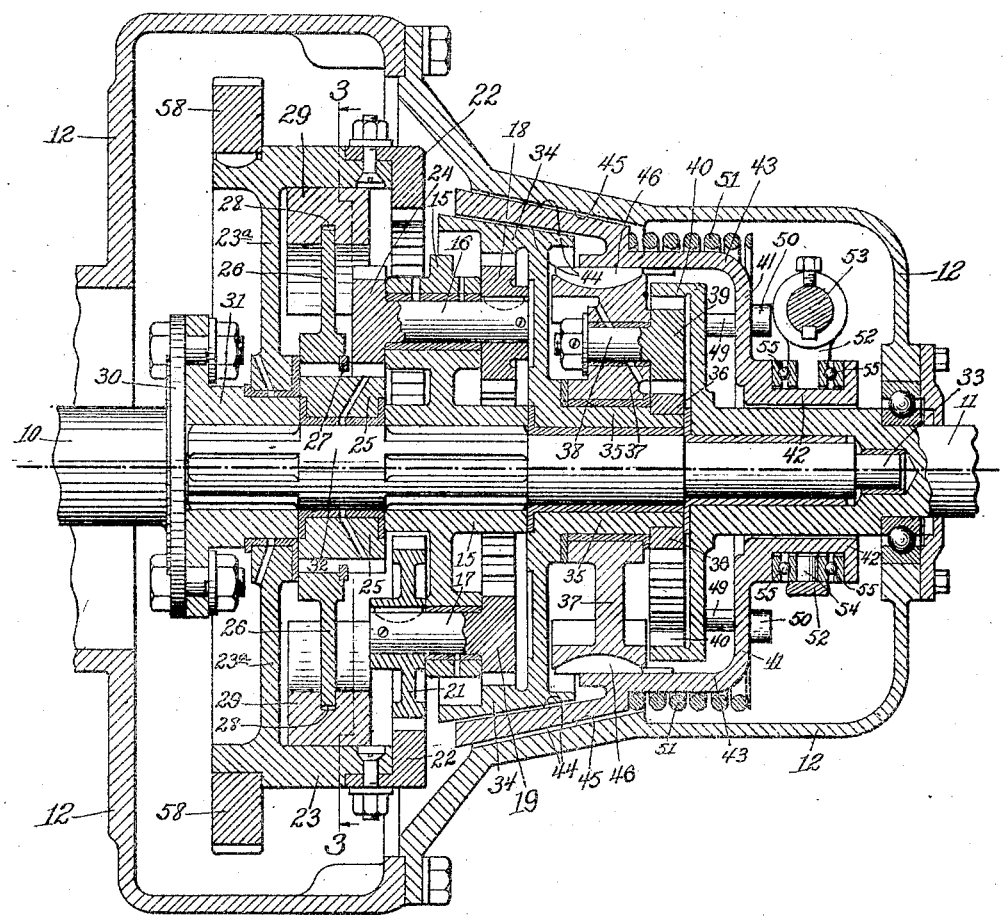

1,580,900

UNITED STATES PATENT OFFICE.

WILLIAM E. JOHNSON, OF CLIFTON, NEW JERSEY, ASSIGNOR, BY MESNE ASSIGNMENTS, TO FLEXO DRIVE CORPORATION, OF CHICAGO, ILLINOIS, A CORPORATION OF ILLINOIS.

FLEXIBLE AUTOMATIC TRANSMISSION.

Application filed February 12, 1921, Serial No. 444,341. Renewed September 14, 1925.

*To all whom it may concern:*

Be it known that I, WILLIAM E. JOHNSON, a citizen of the United States, residing at Clifton, in the county of Passaic and State of New Jersey, have invented certain new and useful Improvements in Flexible Automatic Transmissions, of which the following is a specification.

This invention relates in general to power transmitting mechanisms, and is concerned more particularly with an improved flexible transmission capable of a gradual speed ratio variation from zero to maximum controlled automatically by the resistance torque of the load.

The transmission of the present invention serves to deliver power from a driving element to a driven element, and is most advantageously adapted for employment in any connection where it is desired to vary gradually and automatically the speed ratio between the driving and driven elements in order to maintain the most efficient ratio and thereby prevent overload of the former by the latter.

The present disclosure is based upon two embodiments of the invention which aptly set forth not only the construction and principles involved but also the wide range of use to which the invention may be put. One of the forms of the transmission shown is a simplified one intended for direct attachment to the shaft of an electric motor or the like and in this capacity prevents both the burning out and over-loading of the same during starting and operation. The other form shown is intended to supplant the ordinary hand-operated transmission of a motor vehicle.

The main and primary object of the invention is the provision of a novelly constructed power transmission of the nature described.

Another equally important object is the provision of such a transmission which is characterized in its construction by a compound epicyclic gear train.

A further important object of the invention is the provision of a transmission of this kind, which serves also to supplant the fly wheel ordinarily employed with explosive motors.

The invention further has in contemplation the provision of such a transmission which may be quickly shifted into forward reverse or neutral drive at will, whereby shifting into a drive opposite to that in which the transmission is operating functions as an efficient emergency brake for the vehicle.

Other objects and advantages of the invention will become apparent as the nature of the same is understood from the following detailed description and accompanying drawings, the invention residing primarily in the noved construction, arrangement and operation of parts hereinafter disclosed.

The present invention is obviously capable of modification in unessential details of construction and arrangement, and the particular embodiments of the same chosen for the purpose of exemplification and here presented are therefore not intended to restrict the spirit of the invention or limit unnecessarily the scope of the claims.

In the drawings:

Fig. 1 is an end view of the transmission casing which houses the mechanism of the invention when the same is employed with motor vehicles;

Fig. 2 is a longitudinal composite vertical and horizontal section taken through the casing and mechanism on the line 2—2 of Fig. 1;

Fig. 3 is a transverse section taken on the line 3—3 of Figs. 2 and 4; and

Fig. 4 is a composite sectional view of another form of the invention, the planes on which the section is taken corresponding to those indicated by the line 2—2 of Fig. 1.

Referring now in detail to the drawings and particularly to Fig. 4 thereof, the numeral 10 indicates a drive shaft, 11 a driven shaft coaxially aligned therewith, and 12 a transmission casing which houses the mechanism of this form of the invention. The shafts 10 and 11 are journalled in bearings 13 carried by the casing in the opposite ends thereof. The inner end of the shaft 10 is provided with an axial reduced portion 14 which is rotatably seated in bearings in a corresponding recess in the inner end of the shaft 11.

A spider 15 is fixedly mounted on the feathered inner end of the shaft 10 and carries a pair of oppositely-disposed and freely rotatable countershafts 16. Inasmuch as Fig. 4, as well as Fig. 2, is a composite section taken on two planes at right-angles to each other, it should be understood that the mechanism illustrated above the center line of the view is duplicated on the opposite side of the transmission, and that the mechanism illustrated below the line is likewise duplicated. Only one of the two shafts 16, therefore appears in this view. The spider 15 also carries another pair of oppositely disposed and freely rotatable countershafts 17 which are angularly positioned therein in a plane at right-angles to that containing the shafts 16. The shafts 16 and 17 are provided at corresponding ends with fixed pinions 18 and 19, respectively, the teeth of which mesh outwardly with the internal teeth of a large gear wheel 20 which is formed rigidly on the inner end of the driven shaft 11 and constitutes with either pair of countershafts an epicyclic train. The ends of the shafts 17 opposite the pinions 19 have fixedly mounted thereon larger pinions 21, the teeth of which mesh outwardly with the internal teeth of a large ring member 22 which is rigidly attached to the periphery of a heavy drum 23. This drum is concentric with the shaft 10 and is journalled thereon in such a way as to rotate freely relative to the same.

The shafts 16 are a little longer than the shafts 17, and, at their ends opposite the pinions 18, have fixedly mounted thereon within the interior of the drum 23 smaller pinions 24 the teeth of which mesh inwardly with the teeth of an elongated sleeve gear 25. Said gear is rotatably journalled on the shaft 10 within the drum 23, and carries, adjacent the end wall 23ª of the drum, a disk 26 the inner periphery of which is toothed and intermeshes in locked engagement with that portion of the teeth of the sleeve gear 25 not cooperating with the pinions 24. A retaining ring 27 is disposed in an annular groove cut partly in the disk and partly in the sleeve gear, and serves to position the former longitudinally of the latter. The outer periphery of the disk has cut therein at equally spaced intervals four arcuate recesses or indentations 28 which serve as guides or supports for radial movement of four centrifugally-acting weights 29 straddling the same. These weights are prevented from moving arcuately around the disk, however, because of the abutments formed by the ends of the weight-seating recesses. The construction of the notched disk and weights is clearly illustrated in Fig. 3.

The operation of the form of the invention illustrated in Fig. 4 and hereabove described will now be explained: For the purpose of exemplification we will assume that the drive or power shaft 10 is rotating in a clockwise direction as viewed from the left of Fig. 4, and that the driven shaft 11 is held stationary or practically so by the resistance torque offered by the load. From the construction of the transmission it will be understood that the spider 15 rotates with the drive shaft. Under the conditions above assumed it will be evident that inasmuch as the gear wheel 20 remains stationary under its load the counter-shafts 16 and 17 while revolving around the shaft will be forced to rotate at a relatively high rate of speed in a contra-clockwise direction by reason of the intermeshed relation of their pinions 18 and 19 with said gear 20. The relatively large pinions 21 on the shafts 17 will therefore rotate the drum 23 in a contra-clockwise direction, while the small pinions 24 on the shafts 16 will rotate the sleeve gear 25, the disk 26 and the weights 29 in a clockwise direction and at a greater speed than the drive shaft 10.

As the disk 26 rotates the weights 29 are thrown radially outwards by centrifugal action, and frictionally contact with the inner surface of the drum 23. The frictional resistance thus set up tends to change the contra-clockwise rotation of the drum to a clockwise rotation at the speed of the drive shaft, and to reduce the clockwise speed of the disk and weights to that of the drive shaft. In order for the weights acting on the drum to decrease in the slightest the relative speed between the two, it will be obvious that the drum and weights must act through the pinions 21 and 24 respectively to slow the speed of contra-clockwise rotation of the countershafts 16 and 17. It is also evident, however, that in order to permit this reduction in speed of rotation the gear wheel 20 connected to the load shaft must be rotated slowly in a clockwise direction, the gear reduction set up being dependent upon the relative speed and consequent slippage of the drum and weights. If the resistance of the load offered through the gear wheel 20 is sufficiently great to overcome the frictional engagement between the drum and weights the relative speed between the same will be proportionately high, resulting in a corresponding gear reduction. This reduction approaches a one-to-one drive however as the resistance of the load decreases upon overcoming the inertia of the same, and the relative movement of the drum and weights is stopped by the friction therebetween.

When operating as a one-to-one drive the transmission rotates as a unit about the axis of the drive and driven shafts, and no relative movements of the countershafts, drum and disk occurs.

The maximum torque acting on the drive shaft is determined by the size of the weights used. For instance, if the load most efficiently pulled without strain by a motor is 500 pounds when the same is rotating at 1200 R. P. M. weights will be employed in the transmission which will grip the drum without slippage when the resistance of the load is 500 pounds or less. If this resistance is increased through any cause whatsoever the weights will immediately slip on the inner surface of the drum to produce a gear reduction sufficient to overcome the additional load resistance. The speed of rotation of the driven shaft will of course be decreased in consequence thereof unless the speed of the drive shaft is proportionately accelerated.

Attention is now directed particularly to Fig. 2 of the drawings. The form of the invention therein shown is one in which the transmission previously described is slightly modified for use with a motor vehicle wherein a forward, reverse and neutral connection of the power shaft with the load shaft is desired. From an inspection of this view it will be apparent that the mechanism shown in the left-hand part thereof is identical except in one or two minor details with the complete transmission herebefore described and illustrated in Fig. 4. The additional mechanism shown in the right-hand part of Fig. 2 cooperates with the transmission proper to provide an efficient forward, reverse or neutral drive shift.

In this form of the invention the transmission supplants the ordinary fly wheel, and the flanged end portion 30 of the drive shaft 10 formerly attached to the fly wheel is instead bolted to a heavy collar 31. An extension drive shaft 32 is then rigidly secured in the collar 31 in axial alignment with the motor drive shaft 10. This extension shaft 32 is the equivalent of the drive shaft 10 of Fig. 4, and is provided likewise at its inner end with a reduced portion 33 which seats in a recess of the driven shaft 11. The transmission casing 12 may be a continuation of the motor crank casing, in which event the same need only be journalled at its closed end on the shaft 11.

The pinions 18 and 19, instead of meshing with the gear wheel 20 attached to the driven shaft 11, as shown in Fig. 4, mesh outwardly with the inwardly disposed teeth of a large internal gear wheel 34 which is journalled to rotate freely on the shaft 10 and is provided with an elongated hub portion 35 to which is fixedly attached at the far end thereof a small ring gear 36. The outer periphery of the gear wheel 34 is frusto-conical in shape for a purpose to be set forth later. The hub portion 35 of the gear wheel 34 has rotatably mounted thereon a skeleton frame 37 which has journalled at opposite points therein two countershafts 38. These shafts are provided with small fixed pinions 39 which mesh inwardly with the previously mentioned ring gear carried rigidly on the hub portion 35, and outwardly with the inwardly disposed teeth of an internal gear wheel 40 formed on the inner end of the driven or load shaft 11, thereby forming a second epicyclic train which is adapted to couple with the first by means hereinafter set forth to form therewith a compound epicyclic train.

A clutch member 41 of general bell-shaped cross section is journalled on an enlarged portion of the driven shaft 11 between gear wheel 40 and the end of the casing 12. This member is so journalled as to permit of longitudinal shifting on the shaft 11 and comprises a wide exteriorly grooved hub portion 42, and a radially flanged portion 43 which, at a distance from the hub portion, turns longitudinally and then obliquely outwards to constitute inner and outer frusto-conical surfaces 44 for engagement, when shifted to the left, with the outer frusto-conical surface of the gear wheel 34, and when shifted to the right, with the inner frusto-conical surface 45 of an adjacent portion of the transmission casing 12. The skeleton frame 37 is locked to the clutch member 41 by means of keys 46 seated in aligned guide grooves of both members, but longitudinal movement of the clutch member relative to the skeleton frame is, however, permitted because of the keying construction employed. Intermediate the keys 46 lengthwise slots 47 are cut in the longitudinally extending portion of the clutch member 41. Ears 48 extend radially from the frame 37 into these slots, and are provided with screw-threaded apertures in which are secured longitudinally extending bolts 49 having outwardly turned heads 50. This construction is shown in Fig. 1. A coil spring 51 encompasses the longitudinally extending portion of the clutch member and is confined thereon between a shoulder of the same and the heads 50 of the bolts carried by the skeleton frame 37. Inasmuch as the ears of the frame 37 also key the same to the clutch member 41 and thereby prevent relative rotation, it will be seen that the keys 46 might be dispensed with entirely without changing the result obtained.

In order to manually shift the clutch member from the neutral position shown into frictional engagement with either of the frusto-conical surfaces mentioned, a yoke 52 is provided. This yoke straddles the annularly grooved hub portion 42 of the clutch member, and is keyed at its apex to a transverse pivoting shaft 53 which is journalled in the upper part of the casing. Oppositely disposed lugs 54 extend from the yoke arms into the groove of the hub portion in horizontal alignment with the axis thereof, and are provided on both sides with thrust bearings 55 carried by the groove to prevent friction when the clutch member is shifted longitudinally upon the arcuate movement of said lugs. As shown in Fig. 1, one end of the pivoting shaft 53 projects outside of the casing and is there provided with a control pedal or handle 56 keyed thereto.

The pedal or handle 57 of the ordinary vehicle hand brake may be most conveniently journalled on the projecting portion of the shaft 53 in juxtaposition with the transmission control pedal 56. A ring gear 58 may be keyed to the drum 23 at the left end thereof and serve as an engaging means for the type of self-starter ordinarily employed with motor vehicles.

The cooperation of the transmission proper with the additional mechanism hereabove described and illustrated in Fig. 2 is as follows: The mechanism to the left of and including the gear wheel 34 is substantially the same as the complete transmission illustrated in Fig. 4 with the exception that the gear wheel 34 is freely journalled on the extension of shaft 10 and is not attached to the driven shaft 11 as is the corresponding gear wheel 20 of Fig. 4.

When the forward and reverse drive shifting mechanism is in the position shown in Fig. 2, the transmission is inoperative as such since the entire transmission proper will obviously rotate in a clockwise direction with and at the same speed as the power or drive shaft 10, causing the frame 37 and the clutch member 41 keyed therewith to rotate in a similar direction but at a greater speed.

If the clutch member is now shifted to the left into frictional contact with the periphery of the gear wheel 34, it will be obvious that the said gear wheel will become indirectly locked to, and therefore rotate with, the driven shaft 11, whereupon a forward drive of the driven shaft through the transmission results.

If the clutch member is however shifted to the right into frictional engagement with the stationary inner surface of the casing 12, it will be seen that the skeleton frame will be held stationary with the clutch member, and the rotation of the small ring gear 36 reduced by substantially one half to a reverse rotation of the driven shaft 11 through the pinions 39 and gear wheel 40.

When the transmission is operating in forward drive an efficient emergency braking through the motor and transmission may be effected without injury by shifting from forward into reverse.

I claim:

1. In a power transmission, a driving element, a load-carrying driven element, and centrifugally operated means connecting said elements whereby to drive the latter by the former in a ratio of speed transmission capable of gradual variation under automatic control of the load resistance; said connecting means including a bracket connected to the driving element for rotation therewith, a gear connected to the driven element for rotation therewith, pinions journaled in the bracket and meshed with the gear, and brake members arranged to co-act frictionally under centrifugal force upon relative rotation and connected for such relative rotation upon rotation of the pinions about their axes, whereby to permit rotation of the pinions only when the load resistance is sufficient to overcome static engagement between the brake members.

2. In a power transmission, a driving shaft, a load-carrying driven shaft aligned therewith, and centrifugally operated means connecting said shafts whereby to drive the latter by the former in a ratio of speed transmission capable of gradual variation under automatic control of the load resistance; said connecting means including a bracket connected to the driving shaft for rotation therewith, two countershafts journaled in the bracket, gearing connecting the countershafts with the driven shaft, two frictionally co-acting brake members, gearing connecting one countershaft with one of the brake members to rotate the latter in one direction and gearing connecting the other countershaft with the other brake member to rotate the latter in the opposite direction.

3. In a power transmission, a driving shaft, a load-carrying driven shaft aligned therewith, and centrifugally operated means for connecting said shafts whereby to drive the latter by the former in a ratio of speed transmission capable of gradual variation under automatic control of the load resistance; said connecting means including a bracket connected to the driving shaft for rotation therewith, a gear connected to the driven shaft for rotation therewith, two countershafts journaled in the bracket, pinions mounted on the countershafts and meshed with the gear on the driven shaft, a plurality of centrifugal weight members arranged to revolve about the axis of the transmission, a gear for revolving the weight members, a pinion mounted on one of the countershafts and meshed with the gear associated with the weight members, a drum against which the weight members are arranged to bear frictionally under centrifugal force, a gear for rotating the drum, and a pinion on the other of the countershafts for rotating the gear associated with the drum.

4. In a power transmission, a driving shaft, a driven shaft aligned therewith and provided with a gear for rotating the same in the direction of the driving shaft, a train of gears connecting said shafts and including countershafts revolvable about the axis of the driving shaft and provided with pinions, and two co-acting brake members provided with means for rotating the same, one pinion on each of the countershafts meshing with the gear on the driven shaft, one pinion on one of the countershaft driving one of the brake members, and one pinion on another of the countershafts driving the other of the brake members.

5. In a power transmission, a driving shaft, a driven shaft aligned therewith and provided with an internal gear for rotating the same in the direction of the driving shaft, a train of gears connecting said shafts and including countershafts revolvable about the axis of the transmission and provided with pinions, and two co-acting brake members provided respectively with external and internal gears for rotating the same, one pinion on each of the countershafts meshing outwardly with the internal gear on the driven shaft, one pinion on one of the countershafts meshing outwardly with the internal gear associated with one of the brake members, and one pinion on another of the countershafts meshing inwardly with the external gear associated with the other of the brake members.

In testimony whereof I have hereunto subscribed my name.

WILLIAM E. JOHNSON.